United States Patent
Acharyya et al.

(10) Patent No.: US 9,906,484 B2
(45) Date of Patent: Feb. 27, 2018

(54) DYNAMIC ANALYTICS CONTROLLED INFORMATION DISSEMINATION IN SOCIAL MEDIA

(71) Applicant: International Business Machines Corporation, Armonk, NY (US)

(72) Inventors: Ajoy Acharyya, Kolkata (IN); James E. Bostick, Austin, TX (US); John M. Ganci, Jr., Raleigh, NC (US); Souvik Majumdar, Kolkata (IN); Shuvamoy Saha, Bentonville, AR (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 433 days.

(21) Appl. No.: 14/629,771

(22) Filed: Feb. 24, 2015

(65) Prior Publication Data
US 2016/0248719 A1    Aug. 25, 2016

(51) Int. Cl.
*H04L 12/58*    (2006.01)
*G06F 17/27*    (2006.01)

(52) U.S. Cl.
CPC .......... *H04L 51/32* (2013.01); *G06F 17/2785* (2013.01); *H04L 51/14* (2013.01)

(58) Field of Classification Search
CPC ...... H04L 51/32; H04L 51/14; G06F 17/2785
See application file for complete search history.

(56) References Cited

U.S. PATENT DOCUMENTS

| | | | |
|---|---|---|---|
| 8,234,688 B2 | 7/2012 | Grandison et al. | |
| 8,392,270 B2 | 3/2013 | Ho et al. | |
| 8,572,173 B2 | 10/2013 | Briere et al. | |
| 2005/0182765 A1* | 8/2005 | Liddy | G06F 17/30699 |
| 2010/0242082 A1 | 9/2010 | Keene et al. | |
| 2012/0124176 A1 | 5/2012 | Curtis et al. | |

(Continued)

FOREIGN PATENT DOCUMENTS

WO    2012135249 A2    10/2012
WO    2013140410 A1    9/2013

OTHER PUBLICATIONS

Carminati et al; Private relationships in social networks, 2007.
(Continued)

*Primary Examiner* — Abdullahi E Salad
(74) *Attorney, Agent, or Firm* — Garg Law Firm, PLLC; Rakesh Garg; Christopher K. McLane

(57) ABSTRACT

A method, system, and computer program product for selectively disseminating content in social media are provided in the illustrative embodiments. Prior to a dissemination of the content, the content being prepared for the dissemination is detected. Using Natural Language Processing (NLP), the content is analyzed to identify a theme and a subject matter of the content. A set of data comprising data related to a set of social connections of a user in the social media is analyzed. A second theme resulting from analyzing a first data in the set of data is compared with the theme, the first data corresponding to a first social connection in the set of social connections. When the second theme matches the theme within a threshold, the first social connection is added to a selected sharing group. The content is disseminated to the selected sharing group.

16 Claims, 6 Drawing Sheets

(56) References Cited

U.S. PATENT DOCUMENTS

| | | |
|---|---|---|
| 2013/0085970 A1 | 4/2013 | Karnik et al. |
| 2013/0290426 A1 | 10/2013 | Sorensen |
| 2013/0340089 A1 | 12/2013 | Steinberg et al. |
| 2014/0007255 A1 | 1/2014 | Altaf et al. |
| 2014/0172497 A1* | 6/2014 | Kim .................. G06Q 10/0635 705/7.28 |
| 2014/0230066 A1 | 8/2014 | Hurwitz et al. |
| 2016/0140619 A1* | 5/2016 | Soni .................. G06Q 30/0269 705/14.66 |
| 2016/0182556 A1* | 6/2016 | Tatourian ............. G06F 21/554 726/25 |

OTHER PUBLICATIONS

Annonymous, A system and apparatus for transmitting sensitive data in virtual mediums, Aug. 12, 2013.

Annonymous, System and method to share information in social network based on inlining chat message and browsing history, Nov. 22, 2011.

* cited by examiner

DYNAMIC ANALYTICS CONTROLLED INFORMATION DISSEMINATION IN SOCIAL MEDIA

TECHNICAL FIELD

The present invention relates generally to a method, system, and computer program product for selectively disseminating information. More particularly, the present invention relates to a method, system, and computer program product for dynamic analytics based information dissemination in social media.

BACKGROUND

Social media comprises any medium, network, channel, or technology for facilitating communication between a large number of individuals and/or entities (collectively hereinafter, "users" or "connections"). Some common examples of social media are Facebook and Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional messages, or bi-directional or broadcast communications in a variety of languages and forms. Such communications in the social media data can include proprietary conversational styles, slangs or acronyms, urban phrases in a given context, formalized writing or publication, and other structured or unstructured data.

Structured data is data that conforms to an organization defined by a specification. In a data fragment of a structured data, the content of the data fragment has meaning or significance not only from the literal interpretation of the content of the fragment, but also from the form, location, and other organization-specific attributes of the fragment.

In contrast, unstructured data is data that does not conform to any particular organization, and position or form of the content in a data fragment of unstructured data generally does not contribute to the meaning or significance of the content.

Social media stores information about its users in a structured manner. For example, a user of a social media website has a profile, which includes a set of attributes. The profile attributes in a user profile capture a variety of information about the user, including but not limited to the user's name, location, address, marital status, nationality, age, gender, interests, likes, dislikes, preferences, and so on. Thus, the profile is structured data, comprising a data structure and including an organization of such information within that data structure.

A user's contributions or interactions with the social media can include any type or size of data. For example, a user can post text, pictures, videos, links, or combinations of these and other forms of information to a social media website. Furthermore, such information can be posted in any order, at any time, for any reason, and with or without any context. Thus, a user's interactions with a social media can be regarded as unstructured data.

SUMMARY

The illustrative embodiments provide a method, system, and computer program product for dynamic analytics based information dissemination in social media. An embodiment includes a method for selectively disseminating content in social media. The embodiment detects, prior to a dissemination of the content, that the content is being prepared for the dissemination. The embodiment analyzes, using Natural Language Processing (NLP), the content to identify a theme and a subject matter of the content. The embodiment analyzes a set of data, wherein the set of data comprises data related to a set of social connections of a user in the social media, the user preparing the content. The embodiment compares a second theme with the theme, the second theme resulting from analyzing a first data in the set of data, the first data corresponding to a first social connection in the set of social connections. The embodiment adds, responsive to the second theme matching the theme within a threshold, the first social connection to a selected sharing group. The embodiment disseminates the content to the selected sharing group.

Another embodiment includes a computer program product for selectively disseminating content in social media. The embodiment further includes one or more computer-readable tangible storage devices. The embodiment further includes program instructions, stored on at least one of the one or more storage devices, to detect, prior to a dissemination of the content, that the content is being prepared for the dissemination. The embodiment further includes program instructions, stored on at least one of the one or more storage devices, to analyze, using Natural Language Processing (NLP), the content to identify a theme and a subject matter of the content. The embodiment further includes program instructions, stored on at least one of the one or more storage devices, to analyze a set of data, wherein the set of data comprises data related to a set of social connections of a user in the social media, the user preparing the content. The embodiment further includes program instructions, stored on at least one of the one or more storage devices, to compare a second theme with the theme, the second theme resulting from analyzing a first data in the set of data, the first data corresponding to a first social connection in the set of social connections. The embodiment further includes program instructions, stored on at least one of the one or more storage devices, to add, responsive to the second theme matching the theme within a threshold, the first social connection to a selected sharing group. The embodiment further includes program instructions, stored on at least one of the one or more storage devices, to disseminate the content to the selected sharing group.

Another embodiment includes a computer system for selectively disseminating content in social media. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to detect, prior to a dissemination of the content, that the content is being prepared for the dissemination. The embodiment further includes program instructions, stored on at least one of the one or more storage devices for execution by at least one of the one or more processors via at least one of the one or more memories, to analyze, using Natural Language Processing (NLP), the content to identify a theme and a subject matter of the content. The embodiment further includes program instructions, stored on at least one of the one or more storage devices for execution by at least one of the one or more processors via at least one of the one or more memories, to analyze a set of data, wherein the set of data comprises data related to a set of social connections of a user in the social media, the user preparing the content. The embodiment further includes program instructions, stored on at least one of the one or more storage devices for execution by at least one of the one or more processors via at least one of the one or more memories, to compare a second theme with the theme, the second theme resulting from analyzing a first data in the set of data, the first data corresponding to a first social connection in the set of social connections. The embodiment further includes program instructions, stored on at least one of the one or more storage devices for execution by at least one of the one or more processors via at least one of the one or more memories, to add, responsive to the second theme matching the theme within a threshold, the first social connection to a selected sharing group. The embodiment further includes program instructions, stored on at least one of the one or more storage devices for execution by at least one of the one or more processors via at least one of the one or more memories, to disseminate the content to the selected sharing group.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
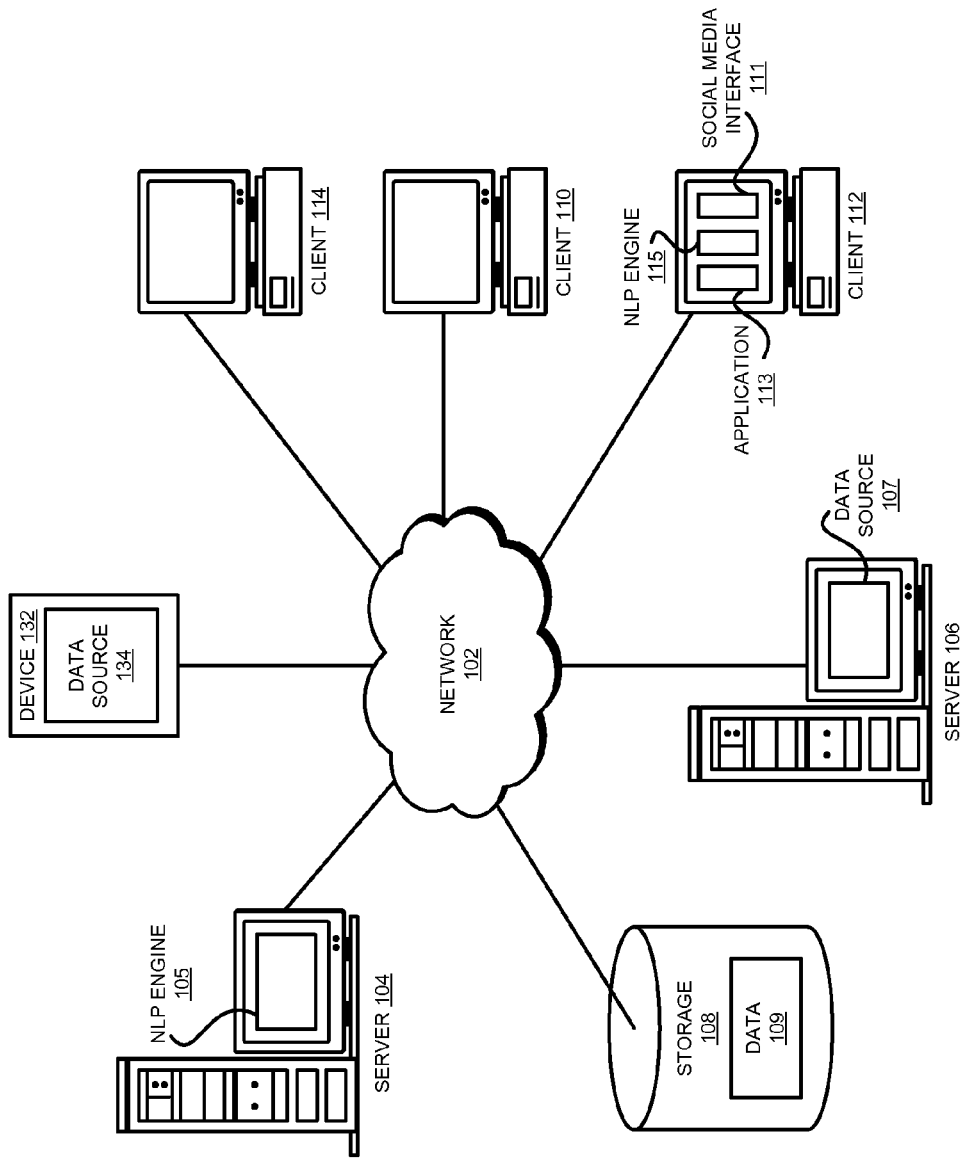
FIG. 1 depicts a block diagram of a network of data processing systems in which illustrative embodiments may be implemented.

Within the scope of this disclosure, the term "share" and variants thereof include any suitable manner of disseminating or contributing textual content by a user in a given social media environment. In the presently available social media environments, a user shares content by performing a "post", a "comment", a "like", a "tweet", an "update", a "tag" operation, or another similarly purposed operation.

Furthermore, the textual content can be data in the form of alphanumeric or symbolic text, or textual data associated with graphical information. Some examples of textual data associated with graphical information include but are not limited to an image name, textual data in an image, or an alternative text associated with graphical data.

A user is associated with, acquainted with, to otherwise able to interact with other users in social media. In other words, a user has connections in social media. Within the scope of the illustrative embodiments, a user's social connections in a given social media environment includes any user, group, or entity, which participates in the given social media environment, and to whom the information shared by the user can reach through some chain of associations in the given social media environment.

The illustrative embodiments recognize that social media presents a number of security and privacy problems to its users. For example, a burglar can access the Facebook page of a user to learn when and where the user has gone on vacation, allowing the burglar the opportunity to break into the user's house. As another example, users sharing articles on controversial and often divisive topics can unknowingly expose themselves to abuse, threats, or retaliation from other users who oppose the user's position on such issues.

As one example, consider real instances of a user sharing politically biased thoughts against a particular figure in an incumbent party. After sharing such thoughts, the user can face undesirable consequences ranging from abusive comments to in-person threats from persons or groups that are supportive of the incumbent party, or other agencies.

The illustrative embodiments recognize that the presently available social media technology is deficient in forewarning a user about the content the user is about to share before the user shares the content. In other words, the presently available social media technology is unable to analyze possible consequences of sharing some content and afford the user an opportunity to reflect upon those possible consequences prior to the user actually shares the content.

The illustrative embodiments further recognize that even when the security or privacy risk is acceptable, or accepted by the user, not all content should be shared by all social connections of the user. Presently available social media technology allows a user to define static groups from which the user can select one or more groups for sharing a particular content.

The illustrative embodiments recognize that such statically defined groups are often unsuitable to adequately warn or protect a user from disseminating some content to undesirable persons in a selected group. For example, suppose that the user has a set of social connections, i.e., a set of other users with whom the user shares information. Within the set of connections, the user has defined a subset, or a group, of social connections with whom the user wishes to shares sports related information.

Now suppose that a user in the subset is an avid fan of team ABC, and another user is an avid fan of team DEF. Assume that the user drafts some content for sharing the user's jubilance when team DEF wins a game against team ABC. If the user shares that content with the subset, the avid fan of team ABC is very likely to become upset with the user—an undesirable consequence of the sharing. In other words, the fans of ABC team in the user's social connections are undesirable persons for sharing this particular content.

The above example is a simplified example of more complex issues of a similar nature. For example, a user's comments on a political situation or a trending societal issue can easily reach an organization or agency that can take an unfavorable view of the user because of those comments. Presently, the social media technology does not provide the user a dynamic analysis of the content that the user is contemplating sharing with the set or a subset of the user's social connections. Presently, the social media technology does not assist the user in dynamically selecting a subset or group of the user's social connections with whom the user can share the particular content that the user is contemplating sharing.

The illustrative embodiments used to describe the invention generally address and solve the above-described problems and other problems related to disseminating information in social media. The illustrative embodiments provide a method, system, and computer program product for dynamic analytics based information dissemination in social media.

An embodiment can be implemented as software instructions to execute in any data processing system, such as a desktop computer, a portable computer, or a mobile device, or a combination thereof. For example, an embodiment can be implemented using a mobile device and a computer, where the mobile device and the computer interoperate over a data network to provide a function of an embodiment.

Within the scope of the illustrative embodiments, dynamic analysis of content and dynamic selecting of a group of social connections for sharing that content are dynamic in that these operations occur when the user prepares the content for sharing but has not yet shared, has prepared the content for sharing but has not yet shared, or a combination thereof. Furthermore, the dynamic nature of these operations causes the analysis of different contents to yield different notifications or other results, prior to an execution of a sharing function of the social media environment or the occurrence of the sharing operation. Additionally, the dynamic nature of these operations causes the selection of different subsets of social connections for sharing different contents, prior to an execution of a sharing function of the social media environment or the occurrence of the sharing operation.

An embodiment detects that a user is preparing content for sharing. For example, the embodiment detects that the user is typing or has typed some content for sharing, such as a status update on Facebook or a tweet on Twitter. The embodiment further detects that the content has not yet been shared, for example, the user has not yet clicked a button to share that content.

The embodiment uses a prior-art natural language processing (NLP) engine to perform NLP on the content being prepared. For example, one embodiment uses NLP to detect a sentiment of the content. Some example sentiments or themes expressed in sharable content include but are not limited to supporting, opposing, advocating, revolting, rebutting, offending, pacifying, acknowledging, encouraging, promoting, agreeing, disagreeing, disparaging, deriding, professing, preaching, appreciating, rejecting, or otherwise expressing an opinion or taking a position about a subject matter of the content.

Upon detecting the subject matter of the content and a sentiment of the content, the embodiment collects structured and unstructured data from the user's social group. The embodiment uses NLP to analyze the collected data of a particular connection to determine that connection's sentiment on the subject matter. If the sentiment of the connection matches the sentiment of the content within a threshold, the embodiment selects the connection a social connection with whom the user can share the content.

A threshold for matching a sentiment can be defined in many ways. One example way of defining a threshold for matching a sentiment is that the sentiments being matched should be synonyms of each other. For example, a supporting sentiment matches an encouraging sentiment within such a threshold, but a liking sentiment does not match a disparaging sentiment within such a threshold.

Another example way of defining a threshold for matching a sentiment is that the sentiments being matched should be of a similar nature. For example, a promoting sentiment matches a supporting sentiment within such a threshold, but a condoning sentiment does not match a disagreeing or a disapproving sentiment within such a threshold.

One embodiment performs the NLP analysis of the content while the content is being prepared and therefore not yet shared. Another embodiment performs the NLP analysis of the content after the content has been prepared but not yet shared.

An embodiment further collects the structured and unstructured data from users, groups, or entities outside the user's social connections. For example, such an embodiment can be configured to collect news articles, publications, reports or documents from interest groups or agencies, or other structured or unstructured data from an organization or the general populous.

Such a broad collection of data, and the NLP analysis thereof by an embodiment, is helpful in forewarning the user about a consensus or general opinion that is prevalent about the subject matter of the content the user is preparing or has prepared. For example, one embodiment notifies the user, before the user shares the content, whether the subject matter of the content is perceived favorably or unfavorably by the user's social connections or other broader audience. Such notification is helpful to the user for deciding whether the user should change how the user's thoughts are expressed in that content, or whether the user should share the content at all.

One embodiment dynamically collects the data from the user's social connections or a broader audience, dynamically performs the NLP analysis on the collected data, or both. Another embodiment pre-collects at least some structured or unstructured data about the user's social connections or a broader audience prior to the user preparing the content, and performs dynamic analysis of collected data when the content is prepared or sharing.

Another embodiment pre-collects at least some structured or unstructured data about the user's social connections or a broader audience, and pre-performs at least some analysis of collected data audience prior to the user preparing the content. The embodiment stores the results of the pre-analysis to improve an efficiency of analyzing and notification operations when the content is prepared for sharing.

An embodiment further performs self-learning. For example, if the embodiment suggested a particular connection as favorable for sharing some content, but the connection provided an unfavorable comment in response to the content, the embodiment learns from the new unfavorable comment to not recommend the connection for future content with similar subject matter and/or sentiment. For example, the embodiment assigns a higher weight to the unfavorable comment, as compared to the data that resulted in favoring the connection. Such weighting causes the unfavorable comment to play a greater role in determining the suitability of the connection for future content with similar subject matter and/or sentiment that might be shared by the user.

Generally, when an embodiment suggests a connection with whom the user can share the content without adverse affects, and that connection responds to the sharing in a favorable manner, the embodiment uses the favorable response to learn or improve the validity of the suggestion for future content with similar subject matter and/or sentiment that might be shared by the user. Conversely, when an embodiment suggests a connection with whom the user can share the content without adverse affects, and that connection responds to the sharing in an unfavorable manner, the embodiment uses the unfavorable response to learn an invalidity, or decrease the validity, of the suggestion for future content with similar subject matter and/or sentiment that might be shared by the user.

The above examples are described to clarify certain operations of various embodiments, and not to imply a limitation. In a similar manner, the various embodiments can be configured for various use-cases, using other self-learning techniques, reinforcements, and adjustments of validity, and the same are contemplated within the scope of the illustrative embodiments.

A method of an embodiment described herein, when implemented to execute on a device or data processing system, comprises substantial advancement of the functionality of that device or data processing system in disseminating information on social media. For example, where prior-art fails to recognize and act upon the user's content prior to the user sharing the content on the social media, an embodiment dynamically analyzes the user's content and an expected reception from the members of the set of user's social connections, and dynamically suggests a subset of those connections for sharing. Furthermore, an embodiment also allows the user an opportunity prior to sharing the content, to evaluate the expressions in the content as well as a decision to share that content in view of a dynamically determined consensus on the subject matter or sentiment of the content. Operating in a manner described herein, an embodiment allows a user to selectively disseminate information on social media. Such manner of dynamic analysis and selection for information dissemination is unavailable in presently available devices or data processing systems. Thus, a substantial advancement of such devices or data processing systems by executing a method of an embodiment allows a user to become forewarned of the expected reactions to the information the user is planning to disseminate on social media, and selectively disseminate the information while mitigating security risks, privacy risks, or other undesirable reactions to that information.

The illustrative embodiments are described with respect to certain content or information, methods of dissemination, social media environments, social connections, structured or unstructured data, analyses, sentiments, matching and thresholds, notifications and suggestions, weights and learning biases, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
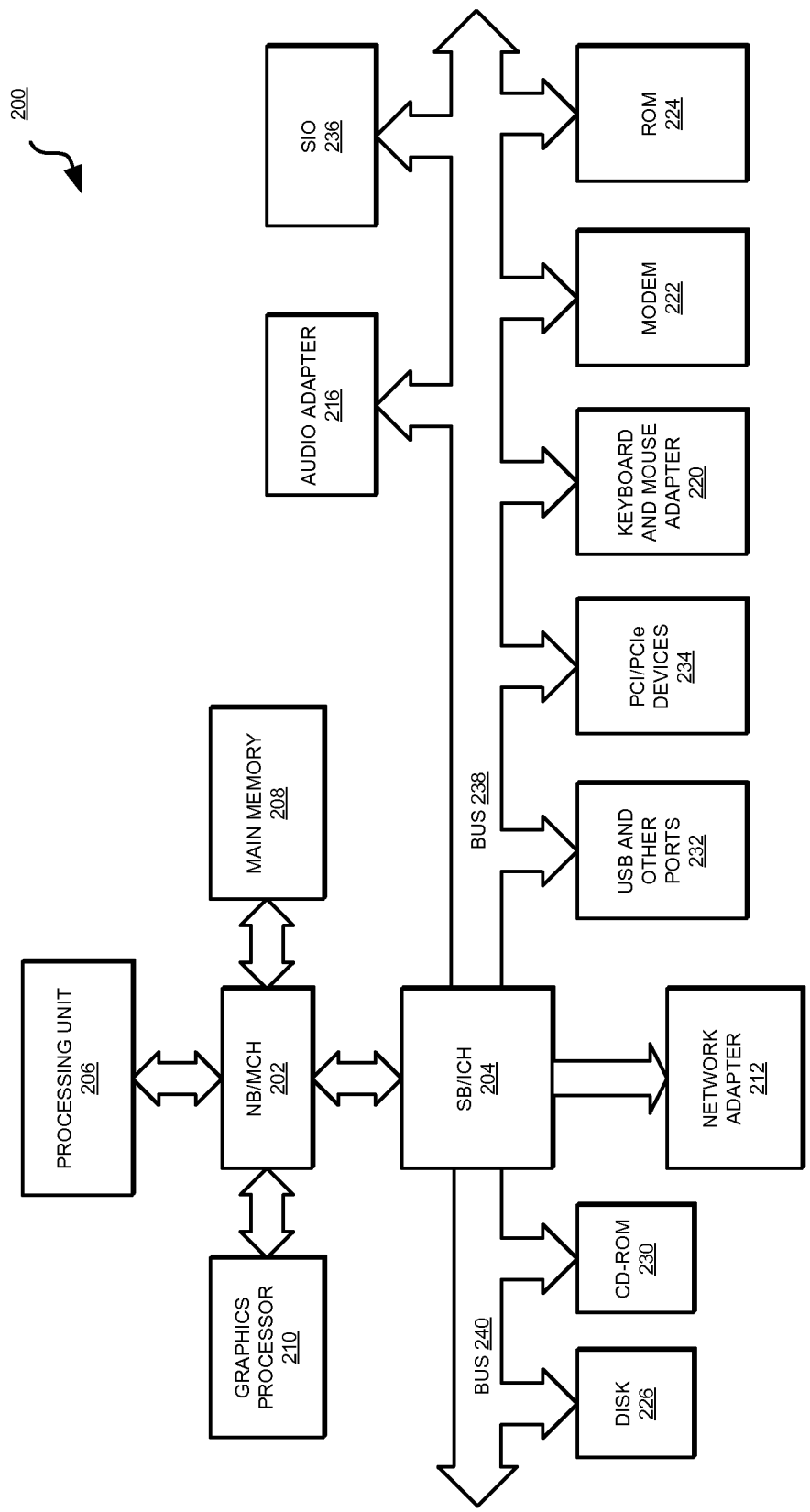
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a mobile device described herein. For example, device 132 can take the form of a smartphone, a tablet computer, a laptop computer, client 110 in a stationary or a portable form, a wearable computing device, or any other similarly purposed device. Data source 134 is a source of structured data, unstructured data, or both, as described herein. Application 113 in client 112 implements an embodiment described herein. Application 113 operates in conjunction with social media interface 111, which is a user interface for a user to interact with a given social media environment, such as to disseminate information in a manner described herein. Application 113 uses NLP engine 115 for performing the analyses described herein. In some embodiments, application 113 uses an NLP engine operating remotely, such as in the form of NLP engine 105 in server 104. Data source 107 is an example of a source of structured and unstructured data such as from a server operating the social media environment using social media interface 111. Storage 108 is any repository that hosts structured data, unstructured data, or some combination thereof, in the form of data 109, and supplies the same to application 113 in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
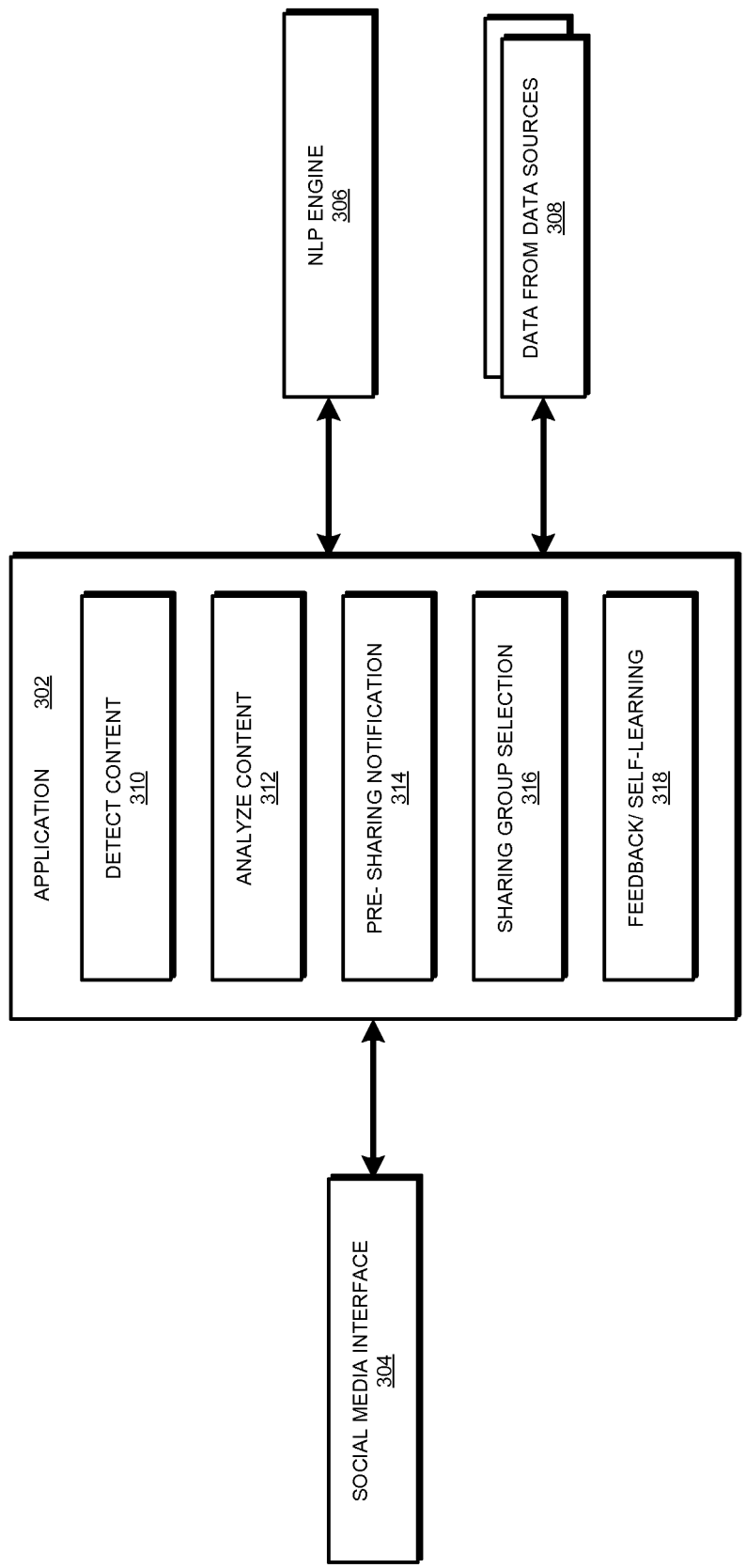
FIG. 3 depicts a block diagram of an example configuration for dynamic analytics based information dissemination in social media in accordance with an illustrative embodiment.

With reference to FIG. 3, this figure depicts a block diagram of an example configuration for dynamic analytics based information dissemination in social media in accordance with an illustrative embodiment. Application 302 is an example of application 113 in FIG. 1. Social media interface 304 is an example of social media interface 111 in FIG. 1. NLP engine 306 is an example of either NLP engine 115 or NLP engine 105 in FIG. 1.

Data 308 is an example of one or more types of data, such as structured data, unstructured data, or a combination thereof, as described earlier. Furthermore, data 308 is sourced from one or more data sources, such as data source 134, data source 107, or a data repository in storage 108.

Component 310 detects that content is being prepared or has been prepared in social media interface 304 for sharing over a social media corresponding to social media interface 306. Component 312 uses NLP engine 306 to analyze the content detected by component 310.

Component 314 provides one or more pre-sharing notifications on social media interface 304 relative to the content detected by component 310. Some non-limiting examples of such notifications are described with respect to FIGS. 4 and 5. For example, if by analyzing at least a portion of data 308 using NLP engine 306 component 314 determines that the content has a negative connotation in a broad audience, or comprises subject matter that is generally ill-received in the user's social connections, component 314 notifies the user of such undesirable implications of the content.

Such a notification is based on dynamic analysis of the content detected by component 310. Such a notification provides the user an opportunity, before sharing the content, to re-evaluate whether the content is suitable for sharing or is drafted in a suitable manner.

Component 316 analyzes the content using NLP engine 306. Based on the analysis, component 316 identifies a sentiment of the content. Component 316 further analyzes all or a portion of data 308 to identify a subset of the set of the user's social connections. The identified subset of social connections is a sharing group that component 316 dynamically selects for the detected content. The members of the sharing group have a sentiment on the subject matter of the content that matches the sentiment of the content within a threshold as described elsewhere in this disclosure.

Figure 5:
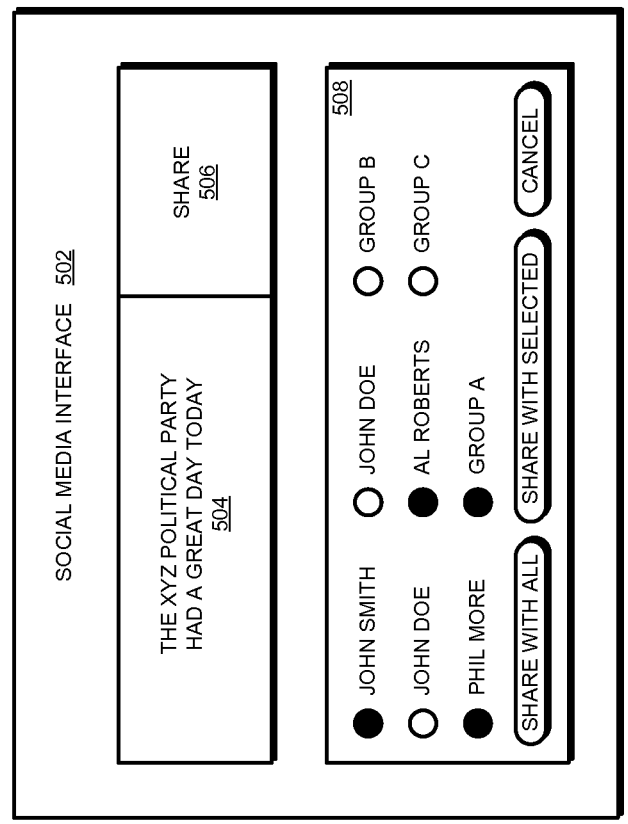
FIG. 5 depicts an example presentation of a dynamically selected sharing group in accordance with an illustrative embodiment.

Component 316 presents the sharing group in any suitable manner on social media interface 304. FIG. 5 provides an example manner of such presentation.

Component 318 improves the notifications and suggestions over time. In one embodiment, component 318 monitors and receives a feedback of the actual response to the content upon sharing with the members of the sharing group. If a member responds favorably to the content, to wit, NLP analysis of the member's response reveals that the member's sentiment on the subject matter of the content is the same or consistent with the sentiment that caused the member to be included in the sharing group, component 316 learns that the member can be suggested for sharing similar content in the future. If a member responds unfavorably to the content, to wit, NLP analysis of the member's response reveals that the member's sentiment on the subject matter of the content is different from or inconsistent with the sentiment that caused the member to be included in the sharing group, component 316 learns or self-trains that the member should not be suggested for sharing similar content in the future, or at least the member's response should weigh more than other data of the member in figure determinations.

Figure 4:
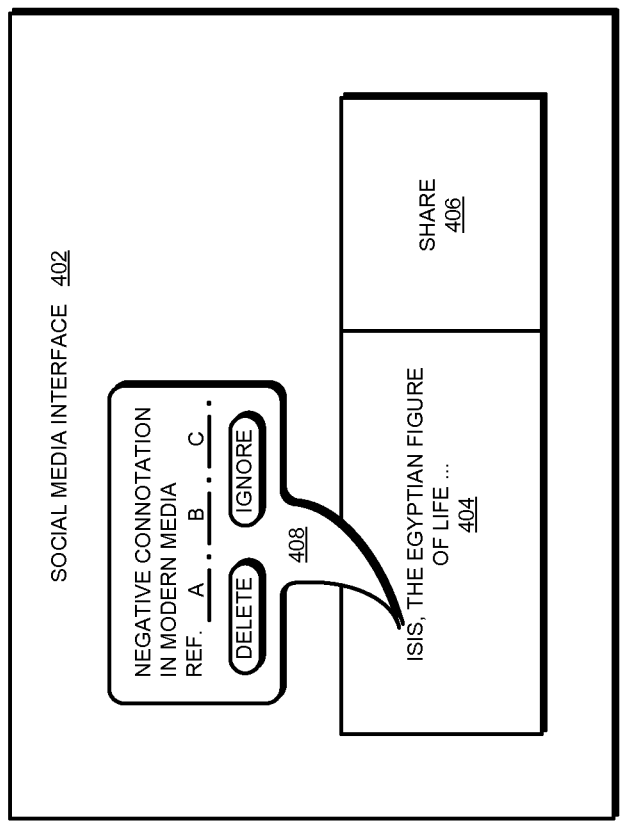
FIG. 4 depicts an example an example pre-sharing notification in accordance with an illustrative embodiment.

With reference to FIG. 4, this figure depicts an example an example pre-sharing notification in accordance with an illustrative embodiment. Social media interface 402 is an example of social media interface 304 in FIG. 3.

Field 404 contains the content that a user is preparing for sharing. The sharing operation occurs when the user provides an input at graphical artifact 406, which for example may be a button. Up to the time notification 408 is presented on social media interface 402, the user has not provided such input at artifact 406.

Suppose the content entirely or partially comprises the sentence "Isis, the Egyptian figure of life," as in the depicted example. When application 302 analyzes the sentence, such as by using NLP engine 306 and data 308, application 302 provides notification 408 on social media interface 402.

In one embodiment, notification 408 appears proximate to or associated with a portion of the content to which the message in notification 408 relates. In another embodiment, notification 408 appears separate from the content, but may reference a portion of the content in other suitable ways.

As an example, given the current stories in the news, as determined by analyzing data 308 using NLP engine 306, the word "Isis" has a negative connotation—a reference to an undesirable organization—even though the word is not used in the same context in the sentence in field 404. Application 302 notifies the user of this possible misinterpretation of a portion of the sentence in notification 408. For example, notification 408 informs the user that the word has a negative connotation in modern media. The application may optionally also provide one or more references to support the determination, such as link "A" to a news article from data 308, reference "B" to an urban dictionary, text "C" describing the possible misinterpretation, or some combination of these and other types of references.

Optionally, notification 408 allows the user to concur with the determination or override the determination. For example, if the user agrees that the possible misinterpretation is not advisable, the user can select the example "Delete" button in notification 408 to delete and replace a portion or all of the sentence. If the user chooses to accept the possible adverse reaction from the possible misinterpretation, the user can select the example "Ignore" button in notification 408 to continue with preparing the sentence for sharing.

The example sentence, the example notification, the example references, the example buttons, and the example operations related to the buttons are described only to clarify the operations of certain embodiments and are not intended to be limiting on the illustrative embodiments. From this disclosure, those of ordinary skill in the art will be able to perform these operations, additional similarly purposed operations, of different operations in a similar manner using different presentations, and the same are contemplated within the scope of the illustrative embodiments.

With reference to FIG. 5, this figure depicts an example presentation of a dynamically selected sharing group in accordance with an illustrative embodiment. Social media interface 502 is an example of social media 402 in FIG. 4. Field 504 is an example of field 404, and artifact 506 is an example of artifact 406, respectively, in FIG. 4.

Field 504 contains the content that a user is preparing or has prepared for sharing. The sharing operation occurs when the user provides an input at graphical artifact 506, which for example may be a button. Up to the time suggestion presentation 508 is presented on social media interface 502, the user has not provided such input at artifact 506.

Suppose the content entirely or partially comprises the sentence "the XYZ political party had a great day today," as in the depicted example. As an example, the great day for the political party may be due to a win over another political party over a divisive issue. When application 302 analyzes the sentence, such as by using NLP engine 306 and data 308, application 302 provides presentation 508 on social media interface 502.

As a simplified example, assume that the user who is preparing the content in field 504 has five individuals as social connections as shown and some other social connections organized in three example social connection groups, namely group "A", group "B", and group "C".

Application 302 analyzes the content in field 504, such as by using NLP engine 306 and data 308, application 302 determines a subject matter and a sentiment of the content. Application 302 then identifies those example individuals and example groups in the user's social connections who have a compatible or matching sentiment, within a threshold, for the subject matter.

Suppose, as an example, that individuals John Smith, Phil More, and Al Roberts, and the members of group "A" exhibit such compatibility upon NLP analysis. Application 302 shows these individuals and group "A" as selected social connections for sharing the content in field 504.

Example presentation 508 on social media interface 502 allows a user to accept the dynamically selected sharing group comprising individuals John Smith, Phil More, and Al Roberts, and the members of group "A" by providing an input at the example button labeled "Share with selected". The "share with selected" button re-configures the sharing operation such that the content will be shared only with the members of the selected sharing group when the user provides the input at artifact 506. Example presentation 508 on social media interface 502 allows a user to modify the dynamically selected sharing group comprising individuals John Smith, Phil More, and Al Roberts, and the members of group "A" by changing the example radio button selections on presentation 508.

Example presentation 508 on social media interface 502 allows a user to reject the dynamically selected sharing group and share the content of field 504 as configured in social media interface 502. For example, the user may have configured to share the contents of field 504 with all social connections. Accordingly, the user can override the suggested sharing group by providing an input at the example button labeled "Share with all". The "share with all" button allows the sharing operation to proceed as configured in social media interface 502 when the user provides the input at artifact 506.

The user can also cancel out of presentation 508, using button labeled "Cancel", to perform another operation, such as change the content, decide not to share with anyone, or other possible operations in a given implementation of social media interface 502.

The depicted manner of displaying a dynamically selected sharing on presentation 508 is not intended to be limiting on the illustrative embodiments. Those of ordinary skill in the art will be able to present similar suggestions in other ways, and the same are contemplated within the scope of the illustrative embodiments.

Figure 6:
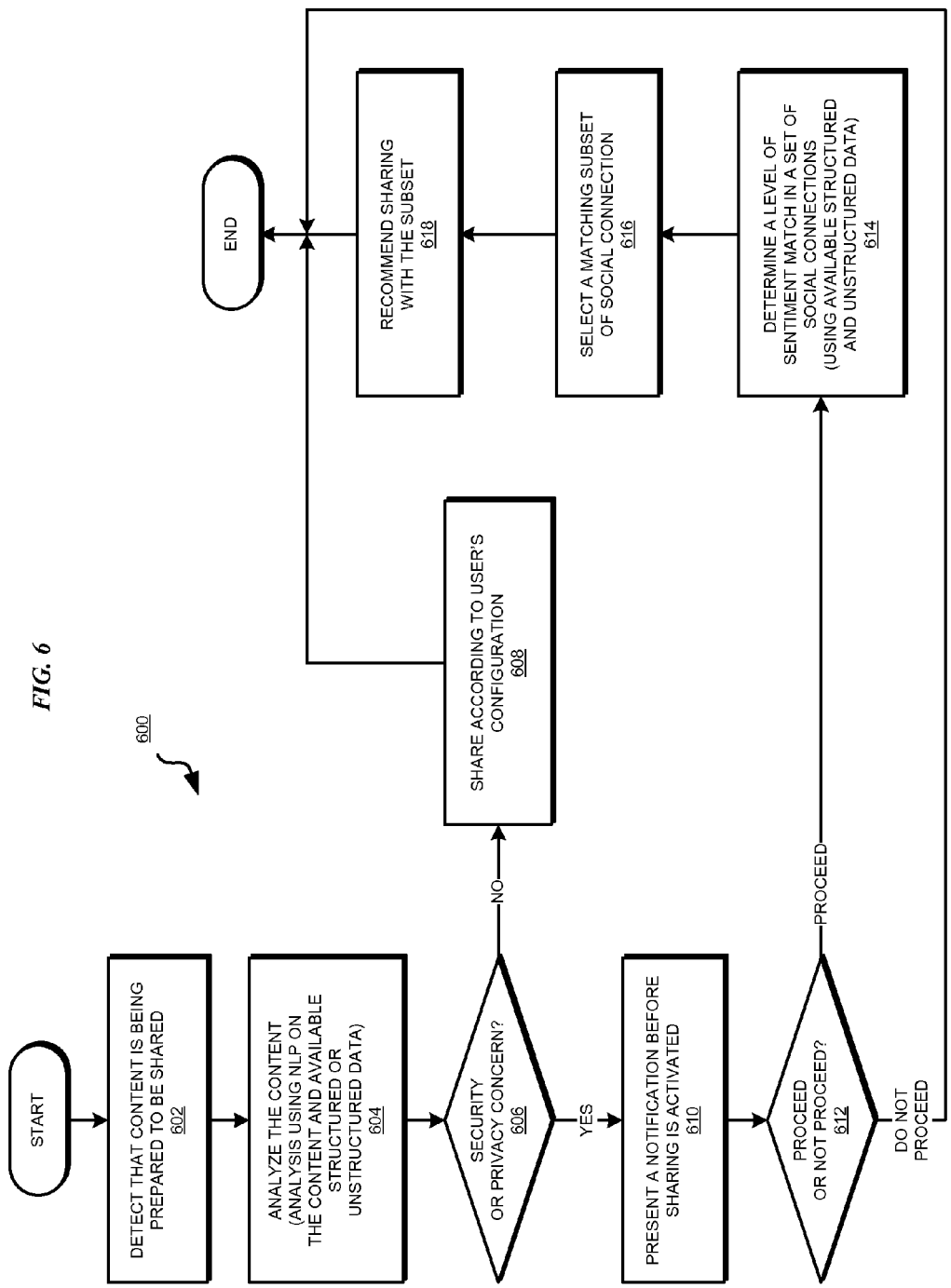
FIG. 6 depicts a flowchart of an example process for dynamic analytics based information dissemination in social media in accordance with an illustrative embodiment.

With reference to FIG. 6, this figure depicts a flowchart of an example process for dynamic analytics based information dissemination in social media in accordance with an illustrative embodiment. Process 600 can be implemented in application 302 in FIG. 3 to produce notification presentation 408 in FIG. 4, selection presentation 508 in FIG. 5, or both.

The application detects that content is being prepared to be shared in a social media interface (block 602). The application analyses the content using NLP on the content and available combination of structured and unstructured data (block 604).

From the analysis, the application determines whether there is any concern or risk associated with the content to the sharing of the content, such as a security concern, a privacy concern, a perception-related concern, or other concern, due to which the content should not be shared (block 606). If the application determines that no such concern warrants withholding the sharing of the content ("No" path of block 606), the application allows the sharing operation to proceed as configured in the social media interface (block 608). The application ends process 600 thereafter.

If the application determines that a concern warrants withholding the sharing of the content ("Yes" path of block 606), the application presents a notification to the user before the sharing operation is activated (block 610). The application determines whether the user has provided an input to proceed with the dissemination or sharing of the content (block 612).

If the user has provided an input to not proceed with the dissemination or sharing of the content ("No" path of block 612), the application ends process 600 thereafter. If the user has provided an input to proceed with the dissemination or sharing of the content ("Yes" path of block 612), the application determines a level of sentiment match, such as within a threshold, between the sentiment of the content and the sentiments of a set of social connections (block 614). For example, the application uses NLP to analyze a sentiment of the content, and sentiments of various social connections using their respective structured and unstructured data, and then performs a comparison to identify the sentiments that match with the sentiment of the content within a threshold.

The application selects a subset of the social connections where the members of the subset correspond to the sentiments that match in block 614 (block 616). The application recommends or suggests sharing the content with the subset (block 618). The application ends process 600 thereafter.

Thus, a computer implemented method, system or apparatus, and computer program product are provided in the illustrative embodiments for dynamic analytics based information dissemination in social media. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selectively disseminating content in social media, the method comprising:
   detecting, prior to a dissemination of the content, that the content is being prepared for the dissemination;
   performing Natural Language Processing (NLP) on the content to identify a theme and a subject matter of the content;
   analyzing a set of data, wherein the set of data comprises data related to a set of social connections of a user in the social media, the user preparing the content;
   comparing a second theme with the theme, the second theme resulting from analyzing a first data in the set of data, the first data corresponding to a first social connection in the set of social connections;
   changing a membership of a selected sharing group, responsive to the second theme matching the theme within a threshold, to include the first social connection;
   disseminating the content to the selected sharing group;
   receiving a first response from the first social connection responsive to disseminating the content to the selected sharing group;
   performing NLP on the first response to determine a third theme of the first response;
   modifying a membership of a second selected sharing group, using the third theme, to include the first social connection a selection for disseminating a second content;
   determining that the third theme does not match the theme within the threshold; and
   self-training to omit, responsive to determining that the third theme does not match the theme within the threshold, the first social connection from the second selected sharing group for disseminating the second content even when a fourth theme of the second content matches the second theme.

2. The method of claim 1, wherein the analyzing the first data comprises:
   performing NLP on at least one of a profile of the first social connection and a second content disseminated in the social media by the first social connection.

3. The method of claim 1, further comprising:
   comparing a third theme with the theme, the third theme resulting from analyzing a second data in the set of data, the second data corresponding to a second social connection in the set of social connections; and
   omitting, responsive to the third theme not matching the theme within the threshold, the second social connection from the selected sharing group.

4. The method of claim 1, further comprising:
   determining, using NLP on a second set of data, whether disseminating the content creates a risk; and
   presenting a notification of the risk responsive to determining that the disseminating creates the risk.

5. The method of claim 4, further comprising:
   presenting the notification relative to a portion of the content, wherein the portion creates the risk.

6. The method of claim 4, further comprising:
   presenting a reference with the notification, the reference supporting the determination that the dissemination creates the risk.

7. The method of claim 4, wherein the second set of data comprises data related to a source other than the set of social connections in the social media.

8. The method of claim 1, wherein the method is embodied in a computer program product comprising one or more computer-readable tangible storage devices and computer-readable program instructions which are stored on the one or more computer-readable tangible storage devices and executed by one or more processors.

9. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

10. A computer program product for selectively disseminating content in social media, the computer program product comprising:
    one or more computer-readable tangible storage devices; and
    program instructions, stored on at least one of the one or more storage devices, comprising:
    code to detect, prior to a dissemination of the content, that the content is being prepared for the dissemination;
    code to perform Natural Language Processing (NLP) on the content to identify a theme and a subject matter of the content;
    code to analyze a set of data, wherein the set of data comprises data related to a set of social connections of a user in the social media, the user preparing the content;
    code to compare a second theme with the theme, the second theme resulting from analyzing a first data in the set of data, the first data corresponding to a first social connection in the set of social connections;
    code to change a membership of a selected sharing group, responsive to the second theme matching the theme within a threshold, to include the first social connection;
    code to disseminate the content to the selected sharing group;

program instructions, stored on at least one of the one or more storage devices, to receive a first response from the first social connection responsive to disseminating the content to the selected sharing group;

code to perform NLP on the first response to determine a third theme of the first response;

code to modify a membership of a second selected sharing group, using the third theme, to include the first social connection a selection for disseminating a second content;

code to determine that the third theme does not match the theme within the threshold; and code to self-train to omit, responsive to determining that the third theme does not match the theme within the threshold, the first social connection from the second selected sharing group for disseminating the second content even when a fourth theme of the second content matches the second theme.

11. The computer program product of claim 10, wherein the code to analyze the first data comprise:

code to perform NLP on at least one of a profile of the first social connection and a second content disseminated in the social media by the first social connection.

12. The computer program product of claim 10, further comprising:

code to compare a third theme with the theme, the third theme resulting from analyzing a second data in the set of data, the second data corresponding to a second social connection in the set of social connections; and code to omit, responsive to the third theme not matching the theme within the threshold, the second social connection from the selected sharing group.

13. The computer program product of claim 10, further comprising:

code to determine, using NLP on a second set of data, whether disseminating the content creates a risk; and code to present a notification of the risk responsive to determining that the disseminating creates the risk.

14. The computer program product of claim 13, further comprising:

code to present the notification relative to a portion of the content, wherein the portion creates the risk.

15. The computer program product of claim 13, further comprising:

code to present a reference with the notification, the reference supporting the determination that the dissemination creates the risk.

16. A computer system for selectively disseminating content in social media, the computer system comprising:

one or more processors, one or more computer-readable memories and one or more computer-readable storage devices; and program instructions, stored on at least one of the one or more storage devices for execution by at least one of the one or more processors via at least one of the one or more memories, comprising:

code to detect, prior to a dissemination of the content, that the content is being prepared for the dissemination;

code to perform Natural Language Processing (NLP) on the content to identify a theme and a subject matter of the content;

code to analyze a set of data, wherein the set of data comprises data related to a set of social connections of a user in the social media, the user preparing the content;

code to compare a second theme with the theme, the second theme resulting from analyzing a first data in the set of data, the first data corresponding to a first social connection in the set of social connections;

code to change a membership of a selected sharing group, responsive to the second theme matching the theme within a threshold, to include the first social connection;

code to disseminate the content to the selected sharing group;

code to receive a first response from the first social connection responsive to disseminating the content to the selected sharing group;

code to perform NLP on the first response to determine a third theme of the first response;

code to modify a membership of a second selected sharing group, using the third theme, to include the first social connection a selection for disseminating a second content;

code to determine that the third theme does not match the theme within the threshold; and code to self-train to omit, responsive to determining that the third theme does not match the theme within the threshold, the first social connection from the second selected sharing group for disseminating the second content even when a fourth theme of the second content matches the second theme.

* * * * *